(12) United States Patent
Herold et al.

(10) Patent No.: US 6,178,637 B1
(45) Date of Patent: Jan. 30, 2001

(54) METHOD AND APPARATUS FOR PRODUCING ROTATIONALLY SYMMETRICAL VALVE SEAT FACES OF HIGH SURFACE QUALITY IN VALVES

(75) Inventors: Stefan Herold, Hallstadt; Oliver Kirsten, Kulmbach, both of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 08/913,631

(22) PCT Filed: Oct. 12, 1996

(86) PCT No.: PCT/DE96/01949

§ 371 Date: Sep. 17, 1997

§ 102(e) Date: Sep. 17, 1997

(30) Foreign Application Priority Data

Jan. 20, 1996 (DE) .............................................. 196 02 068

(51) Int. Cl.$^7$ .............................. B21D 53/10; B21K 1/24
(52) U.S. Cl. ......................................... 29/890.122; 29/464
(58) Field of Search ............................... 29/890.122, 464, 29/888.44, 557; 72/75

(56) References Cited

U.S. PATENT DOCUMENTS

| | | | |
|---|---|---|---|
| 2,232,843 | * | 2/1941 | Drissner et al. .......................... 29/37 |
| 3,400,440 | * | 9/1968 | Carlson ............................ 29/890.122 |
| 4,398,407 | * | 8/1983 | De Fay, Jr. .............................. 72/75 |
| 4,558,498 | * | 12/1985 | Satoh ................................ 29/890.122 |
| 5,826,453 | * | 10/1998 | Prevey, III .............................. 72/75 |

FOREIGN PATENT DOCUMENTS

0126167 * 9/1980 (JP) ................................. 29/890.122

OTHER PUBLICATIONS

Official Gazette, vol. 627, p. 262, 545,016 Method of Making Timing Valves, Carl E. Bazley, Oct. 4, 1949.*

* cited by examiner

Primary Examiner—David P. Bryant
Assistant Examiner—Marc W. Butler
(74) Attorney, Agent, or Firm—Ronald E. Greigg; Edwin E. Greigg

(57) ABSTRACT

In known methods for producing rotationally symmetrical valve seat faces, the valve closing body is brought into contact with the valve seat face of the valve seat body, set into a rotary motion, and set parallel to the rotary axis into an oscillating motion of high frequency. When the valve is assembled, care must then be taken that this pairing of the valve closing body and the valve seat body is preserved. In the novel method, the valve seat body is inserted into a receiving body and fixed by means of a tappet. A spherical tool body engages the valve seat face of the valve seat body with a contact pressure force and rotates in a rotary direction that is opposite a rotary direction of the valve seat body. The valve seat body axis and the tool body rotary axis are inclined relative to one another, so that a lubricant introduced can constantly build up a film of lubricant between the tool body and the valve seat face, and an elastic deformation ensures in the valve seat face, producing a relatively broad smoothing trace without significant indentation. The method and the apparatus are especially well suited to machining valve seat faces of fuel injection valves for fuel injection systems of internal combustion engines.

14 Claims, 2 Drawing Sheets

METHOD AND APPARATUS FOR PRODUCING ROTATIONALLY SYMMETRICAL VALVE SEAT FACES OF HIGH SURFACE QUALITY IN VALVES

PRIOR ART

The invention is based on a method and an apparatus for producing rotationally symmetrical valve seat faces of high surface quality in valves. A method and an apparatus for performing the method are already known (German Patent DE 39 25 043 C2), in which the movable valve part is put into contact with the valve seat face of the valve seat body and set into a rotary motion; an oscillating motion acting parallel to the axis of rotation is transmitted at high frequency to the valve seat body and the movable valve part. Although this produces surfaces with a very high surface quality that assures good tightness of the valve, nevertheless it is disadvantageous for the assembly of the valve that the individual pairings of the movable valve part and valve seat body that have been treated by the known method must be retained, which is a problem in terms of the sequence of assembly.

ADVANTAGES OF THE INVENTION

The method of the invention and the apparatus of the invention have the advantage over the prior art that in a simple way, an improvement in the surface quality of rotationally symmetrical valve seat faces is created, so that the tightness of the valve in cooperation with sealing faces on the movable valve part is substantially improved without requiring metal-cutting machining. The elastic deformation between the valve seat face and the tool body resulting from Hertzian stress produces a relatively broad, smoothed trace on the valve seat face, in which the surface roughness is reduced, without significantly indenting the valve seat face of the valve seat body. During the assembly of the valve with the valve seat body treated according to the invention, in contrast to a valve seat body treated by the known method, no predetermined pairing with a movable valve part has to be maintained.

By the provisions recited herein advantageous further features of and improvements to the method and the apparatus for performing the method are possible.

It is especially advantageous for a tool body axis of rotation, about which the tool body is rotated, to be inclined relative to a valve seat body axis extending longitudinally of the valve seat body, as a result of which a lubricant introduced into a region of the area of contact between the valve seat body and the tool body is repeatedly reintroduced to the area of contact and a layer of lubricant builds up at the area of contact, which prevents "seizing" between the valve seat body and the tool body. It is also advantageous to embody the valve seat body chucking unit of the apparatus from a receiving body and a holding-down body, which makes easy insertion, fixation and removal of the valve seat body possible.

BRIEF DESCRIPTION OF THE DRAWINGS

An exemplary embodiment of the invention is shown in simplified form in the drawing and described in further detail in the ensuing description.

DESCRIPTION OF THE EXEMPLARY EMBODIMENT

Figure 1:
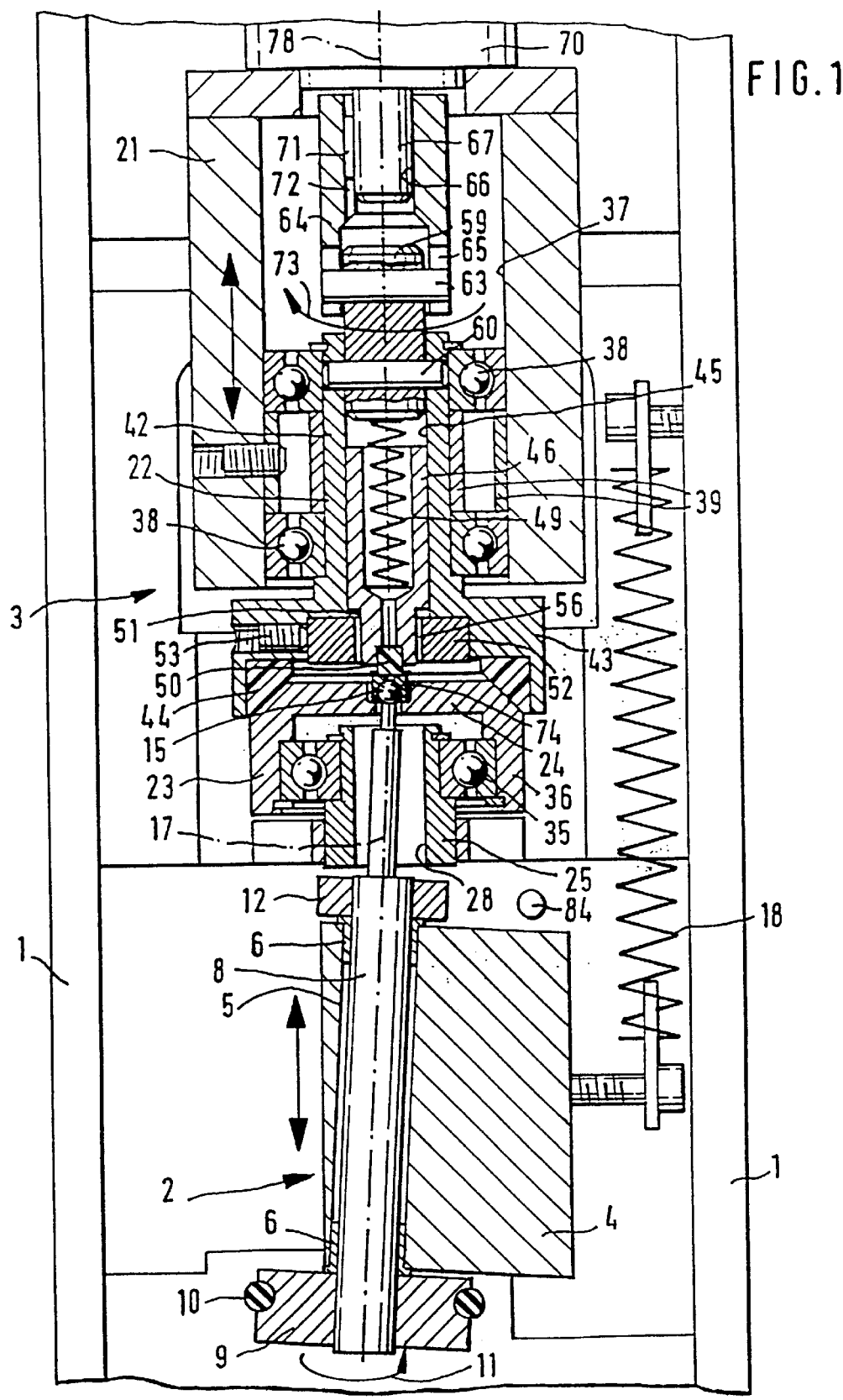
FIG. 1 shows an apparatus for producing rotationally symmetrical valve seat faces in valves.
Figure 2:
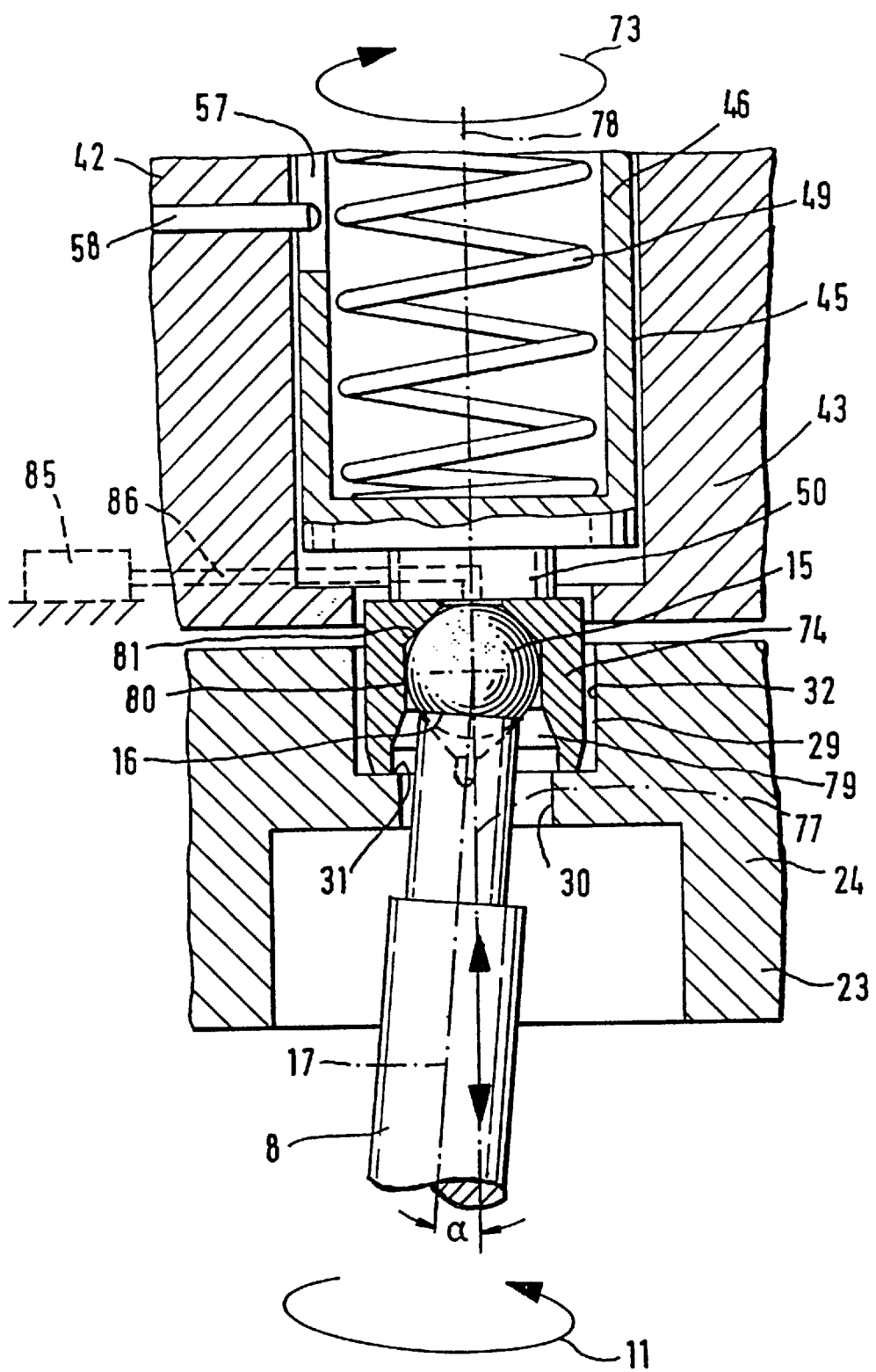
FIG. 2 shows a detail of the apparatus of FIG. 1 on a larger scale.

In FIG. 1, an apparatus according to the invention for producing rotationally symmetrical valve seat faces of high surface quality in valves is shown; it has an apparatus frame 1, on which a tool holder unit 2 and a valve seat body chucking unit 3 are supported. The tool holder unit 2 and valve seat body chucking unit 3 are axially displaceable in the direction of the longitudinal axis of the apparatus frame 1. The tool holder unit 2 has a bearing block 4, with a bearing bore 5 extending on an incline from the longitudinal axis of the apparatus frame 1, in which bore bearing bushes 6 are disposed that act as slide bearings for a tool receiving body 8, which extends, thus rotatably supported, through the bearing bore 5 of the bearing block 4. Connected to the tool receiving body 8 is a pulley 9, which is engaged by a drive belt 10 that rotates the tool receiving body 8 in the direction of the arrow 11. Instead of the belt drive, the tool receiving body 8 can also be driven directly or via a gear by an electric motor. On the side of the bearing block 4 remote from the pulley 9, a stop disk 12 is secured to the tool receiving body 8. On the end of the tool receiving body 8 remote from the pulley 9, a spherical tool body 15 is secured, as also shown in FIG. 2. The tool body 15 is preferably formed by a spherical body that rests on an end face 16 of the rotationally symmetrical 8 and is retained thereon. To that end, an internal cone 19, shown in dashed lines, extends from the end face 16 into the interior of the tool receiving body 8 and centers the spherical body. The tool body 15 is retained on the tool receiving body 8, for instance by adhesive bonding, soldering or the like, or by the generation of negative pressure in the internal cone 19. Together with the tool receiving body 8, the tool body 15 is rotatable about a tool body axis of rotation 17, which is at the same time the longitudinal axis of the tool receiving body 8. The bearing block 4 is engaged by one end of a tension spring 18, which with its other end is secured to the apparatus frame 1 and onto which the tool holder unit 2 exerts a force for displacement in the direction of the valve seat body chucking unit 3.

The valve seat body chucking unit 3 has a base body 21, a holding-down body 22, and a receiving body 23. The receiving body 23 is cup-shaped and with a bottom part 24 protrudes past a bearing body 25 that is connected in fixed fashion to the apparatus frame 1. Extending in the longitudinal direction, the bearing body 25 has a through conduit 28, through which the end of the tool receiving body 8 protruding from the bearing block 4 extends in such a way that the tool body 15 is located at least partly inside a stepped receiving opening 29 in the bottom part 24 of the receiving body 23. The receiving opening 29 penetrates the bottom part 24 and has a first portion 30, toward the bearing body 25, that changes over at a receiving shoulder 31 into a second portion 32 of larger diameter. A roller bearing 35 is mounted on the bearing body 25, and the receiving body 23 is mounted with its cylindrical jacket 36 on the roller bearing 35, so that the receiving body 23 is supported rotatably on the apparatus frame 1 around the bearing body 25. On the side of the receiving body 23 remote from the bearing block 4, the base body 21 is supported axially movably on the apparatus frame 1.

Two roller bearings 38 are press-fitted into a bearing opening 37 of the base body 21 with an axial spacing from one another, to which end spacer sleeves 39 are disposed between the roller bearings 38. The outer spacer sleeve 39 is fixed by means of at least one clamping screw passing through the base body 21, or by a pin. A shaft body 42 of the holding-down body 22 is press-fitted into the roller bearing 38 and thus protrudes partway into the base body 21. The holding-down body 22 also has a collar body 43, which adjoins the end of the shaft body 42 protruding from the base body 21 and faces toward the receiving body 23. Disposed on the collar body 43 is an elastic annular body 44, with which the collar body 43 can be placed on the receiving body 23 and carry it with it by frictional engagement in the same direction of rotation if the holding-down body 22 rotates. In a slide bore 45 provided in the shaft body 42 and in the collar body 43 of the holding-down body 22, a tappet 46 is slidably supported; the tappet is urged in the direction of the receiving body 23 by a compression spring 49. The spring force of the compression spring 49 is greater than the spring force of the tension spring 18. A preferably elastically embodied contact-pressure body 50 is disposed on the end of the tappet 46 that protrudes from the collar body 43. In the exemplary embodiment of the apparatus shown in FIG. 1, the end of the tappet 46 that receives the contact-pressure body 50 is provided with at least two faces 51 on its circumference and protrudes into a driving ring 52, which is retained inside the collar body 43 by means of a screw 53 and has a driving opening 56, which has faces corresponding to the faces 51, so that upon a rotation of the holding-down body 22, the tappet 46 is made by the driving ring 52 to execute the same rotary motion. In the exemplary embodiment of FIG. 2, instead of a driving ring, a driving groove 57 is formed in the wall of the tappet 56, and a driving pin 58 that passes through the wall of the shaft body 42 protrudes into this groove.

Remote from the collar body 43, a transmission bolt 59 protrudes into the slide bore 45; the end of the compression spring 49 remote from the tappet 46 rests on the transmission bolt, which is penetrated by a first transverse pin 60, that also penetrates the wall of the shaft body 42, so that the transmission bolt 59 and the shaft body 42 are firmly coupled together. The end of the transmission bolt 59 protruding from the shaft body 42 is penetrated by a second transverse pin 63 and protrudes into a coupling sleeve 64, which is forked on the side toward the transmission bolt 59 and engages longitudinal grooves 69 via the second transverse pin 63 protruding from the transmission bolt 59, so that upon a rotation of the coupling sleeve 64, the transmission bolt 59 is driven in the same direction of rotation. A rotary shaft 67 of an electric motor 70 secured to the base body 21 protrudes into a coupling opening 66 of the coupling sleeve 64 and is connected in a manner fixed against relative rotation via a spline 71 that engages a keyway 72 of the coupling opening 66 and protrudes into the rotary shaft 67, so that via the coupling sleeve 64 the electric motor 70 can rotate the holding-down body 22 in the direction of the arrow 73, which is opposite the direction of rotation of the tool receiving body 8 in the direction of the arrow 11.

In FIGS. 1 and 2, the valve seat body chucking unit 3 is shown in each case in a position in which a valve seat body 74 is seated on the receiving shoulder 31 of the receiving opening 29 of the receiving body 23 and is held in this position by the tappet 46 of the holding-down body 22, in which position a valve seat body axis 77, extending longitudinally, extends in alignment with a longitudinal axis 78 of the valve seat body chucking unit 3. The valve seat body 74 is fastened so firmly between the tappet 46 and the receiving body 23 that upon a rotation of the holding-down body 22 in the direction of the arrow 73, it is rotated in the same direction about the valve seat body axis 77 coaxially to the longitudinal axis 78. According to the invention, the rotary axis 17 of the tool body is inclined relative to the valve seat body axis 77 by an angle α, which is between approximately 2 and 10° and in particular is 3°. The valve seat body 74 has a longitudinal bore 79, extending coaxially to the valve seat body axis 77 and penetrating the valve seat body 74 with stepped portions; a guide portion 80 with walls parallel to the valve seat body axis 77 is adjoined, remote from the receiving shoulder 31, by a valve seat face 81, again in the form of a portion of the longitudinal bore 79, which tapers conically as it extends away from the receiving shoulder 31. The valve seat body 74 is used for instance in known fuel injection valves of fuel injection systems for internal combustion engines, in particular mixture-compressing internal combustion engines with externally supplied ignition. The tool receiving body with the tool body 15 protrudes into the longitudinal bore 79 of the valve seat body 74; the spherical tool body 15 is pressed against the valve seat face 81 with a contact pressure, generated by the tension spring 18, of approximately 5 to 50 N, and in particular approximately 20 N. The valve seat face 81 and the spherical tool body touch one another in a contact area in which, in the mounted state of the valve, a movable closing body, in particular a spherically embodied closing body of the same diameter as the tool body 15, rests in sealing fashion. The valve seat body 74 is fabricated from metal, especially from a steel alloy. For the spherical tool body 15, a material is selected that has at least the same hardness as the valve seat body 74, such as steel, ceramic, glass or the like. For machining a valve seat body 74, first the base body 21 with the holding-down body 22 is displaced along the longitudinal axis 78 of the apparatus frame 1 in such a way that it is spaced apart sufficiently from the receiving body 23 to allow the valve seat body 74 to be inserted into the receiving opening 29 in such a way that it rests with its valve seat face 81 on the tool body 15. When the holding-down body 22 is lifted away from the receiving body 23, the tool holder unit 2 is displaced by the force of the tension spring 18 along the apparatus frame 1 toward the receiving body 23 far enough that the bearing block 4 comes to rest on a stop bolt 84 of the apparatus frame 1. In this position, the tool body 15 protrudes farther out of the receiving opening 29 and thus makes it easier to introduce the valve seat body 74. After that, the base body 21 with the holding-down body 22 is displaced, for instance by means of a pneumatic or hydraulic cylinder, toward the receiving body 23 until such time as the collar body 43 rests with the annular body 44 on the receiving body 23, and the valve seat body 74 is firmly pressed against the receiving shoulder 31 by the contact-pressure body 50. The tool holder unit 2 with the tool body 15 is displaced in the process counter to the force of the tension spring 18 and lifts away from the stop bolt 84. In this position, the tool body 15 rests on the valve seat face 81 with a contact-pressure force, generated by the tension spring 18, of 20 N, for example. To avoid "seizing" between the tool body 15 and the valve seat face 81, it is expedient to add a lubricant, for instance an oil in the form of a lubricating oil, to the region of the contact area between the tool body 15 and the valve seat face 81. The lubricant can be dispensed by a lubricant supply device 85 via a movable lubricant line 86 into the region of the contact area between the valve seat body 81 and tool body 15 before the valve seat body 74 is mounted on top, or after the mounting of the valve seat body 74 on the tool body 15, or during the machining operation. In another embodiment, the valve seat face 81 is moistened with lubricant before the valve seat body 74 is mounted on the tool body 15. Once the valve seat body 74 has been inserted and the apparatus has been closed, the tool body 15 is rotated in the direction of the arrow 11 and the valve seat body 74 is rotated in the opposite direction of rotation, that is, the direction of the arrow 73. In this process, the valve seat body 74 rotates at approximately 2000–5000 rpm, and. in particular approximately 4000 rpm, and the tool body 15 rotates at approximately 300 to 1000 rpm and in particular approximately 500 rpm, and the machining time is approximately 30 seconds. For performing the method, it is not absolutely necessary that the tool body 15 and valve seat body 74 rotate in opposite directions; on the contrary, it is also possible for both bodies 15, 74 to rotate in the same direction at different speeds. The pressing of the tool body 15 against the valve seat face 81 causes an elastic deformation of the valve seat face 81 and the tool body in the region of the contact area as a consequence of the Hertzian stress, as a result of which a relatively broad smoothing trace without significant indentation in the valve seat face is achieved, which upon later joining together with a valve closing body assures a tight closure of the valve. The inclination of the rotary axis 17 of the tool body by the angle α relative to the valve seat body axis 77 means that lubricant is fed constantly, fresh, into the region of the contact area between the valve seat face 81 and the tool body 15, and thus a film of lubricant constantly builds up in the contact area and prevents "seizing".

The foregoing relates to preferred exemplary embodiments of the invention, it being understood that other variants and embodiments thereof are possible within the spirit and scope of the invention, the latter being defined by the appended claims.

What is claimed is:

1. A process for producing rotationally symmetrical valve seat faces with a high surface quality on fuel injection valves for internal combustion engines, which comprises forming at least one inclined valve seat face on a valve seat body, forming a tool body in a shape of a ball, directing the valve seat face of the valve seat body into contact with a face of said tool body, and moving both the valve seat body and the tool body relative to each other in a rotational movement, applying a compression force (18) onto said tool body against the valve seat face (81) of the valve seat body (74) thereby elastically deforming the valve seat face (81) and the tool body (15) along contact faces of the tool body and the valve seat face, rotating the valve seat body (74) around a valve seat body axis (77) and rotating the tool body (15) around a tool body rotational axis (17), and the valve seat body axis (77) and the tool body rotational axis (17) are always inclined in relation to each other and a constant angle is maintained between the valve seat body axis and the axis of the tool body to achieve a relatively broad smoothing trace without a significant indentation thereby forming a valve seat face of high surface quality before the valve is used.

2. A process according to claim 1, in which the compression force (18) is exerted via the tool body (15).

3. A process according to claim 2, in which the valve seat body (74) and tool body (15) are rotated in opposite directions.

4. A process according to claim 3, which includes introducing a lubricant into a region of the contact face between the valve seat face (81) and the tool body (15).

5. A process according to claim 2, which includes introducing a lubricant into a region of the contact face between the valve seat face (81) and the tool body (15).

6. A process according to claim 1, in which the valve seat body (74) and tool body (15) are rotated in opposite directions.

7. A process according to claim 6, which includes introducing a lubricant into a region of the contact face between the valve seat face (81) and the tool body (15).

8. A process according to claim 1, which includes introducing a lubricant into a region of the contact face between the valve seat face (81) and the tool body (15).

9. A device for producing rotationally symmetrical valve seat faces with a high surface quality on fuel injection valves for internal combustion engines, comprising a valve seat body (74) including at least one inclined valve seat face, a tool body (15) which is secured to a tool receiving body (8) of a tool holder unit (2) and which is rotated with said tool receiving body around a tool body rotational axis (78), a valve seat body chucking unit (3) as well as a compression force for impinging on the valve seat body and the tool body toward each other, said tool body (15) is embodied in the shape of a ball and the compression force (18) is of sufficient magnitude that the valve seat face (81) and the tool body (15) are deformed elastically on a contact face and that the valve seat body (74) has a valve seat body axis (77) that extends in a longitudinal direction and the valve seat body axis (77) and the tool body rotational axis (17) are always inclined in relation to each other at a constant angle which is maintained between the valve seat body axis and the axis of the tool body to achieve a relatively broad smoothing trace without a significant indentation thereby forming a valve seat face of high surface quality before the valve is used.

10. A device according to claim 9, in which the compression force is exerted by the tool body (15) by means of a spring force (18).

11. A device according to claim 9, in which the valve seat body (74) and the tool body (15) are rotated in opposite directions.

12. A device according to claim 9, in which a lubricant is added in a region of the contact face between the valve seat face (81) and the tool body (15).

13. A device according to claim 9, in which the valve seat body chucking unit (3) has a rotatably supported receiving body (23) and a rotatably supported holding-down body (22).

14. A device according to claim 13, in which the holding-down body (22) is supported so that it moves axially.

* * * * *

UNITED STATES PATENT AND TRADEMARK OFFICE
CERTIFICATE OF CORRECTION

PATENT NO. : 6,178,637 B1
DATED : January 30, 2001
INVENTOR(S) : Stefan Herold and Oliver Kirsten It is certified that error appears in the above-identified patent and that said Letters Patent is hereby corrected as shown below:

<u>Title page,</u>
Item [86] should read as follows:

[86] PCT No.: PCT/DE96/01949
    371 Date: September 19, 1997
    102(e) Date: September 19, 1997

Signed and Sealed this

Twenty-third Day of October, 2001

Attest:

NICHOLAS P. GODICI
Acting Director of the United States Patent and Trademark Office Attesting Officer